(12) United States Patent
Amano et al.

(10) Patent No.: US 11,078,873 B2
(45) Date of Patent: Aug. 3, 2021

(54) FUEL TANK

(71) Applicant: TOYOTA JIDOSHA KABUSHIKI KAISHA, Toyota (JP)

(72) Inventors: Shinsuke Amano, Okazaki (JP); Yuuki Nagase, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 16 days.

(21) Appl. No.: 16/149,496

(22) Filed: Oct. 2, 2018

(65) Prior Publication Data
US 2019/0128227 A1 May 2, 2019

(30) Foreign Application Priority Data

Oct. 26, 2017 (JP) .............................. JP2017-207160

(51) Int. Cl.
*F02M 37/00* (2006.01)
*B60K 15/03* (2006.01)
(Continued)

(52) U.S. Cl.
CPC ......... *F02M 37/0094* (2013.01); *B60K 15/03* (2013.01); *B60K 15/03177* (2013.01);
(Continued)

(58) Field of Classification Search
CPC .. F02M 37/0011; F02M 37/007; F02M 37/08; F02M 37/22; B60K 15/03;
(Continued)

(56) References Cited

U.S. PATENT DOCUMENTS 3,021,855 A * 2/1962 Cartwright ........... B60K 15/077
137/38
6,138,857 A * 10/2000 Keller ..................... B29C 49/20
220/495.01
(Continued)

FOREIGN PATENT DOCUMENTS

CN 204249813 U 4/2015
DE 10 2012 009 157 A1 11/2013
(Continued)

*Primary Examiner* — Angelisa L. Hicks
(74) *Attorney, Agent, or Firm* — Oblon, McClelland, Maier & Neustadt, L.L.P.

(57) ABSTRACT

Provided is a fuel tank made of resin, including: a fuel tank body that is enclosed by a bottom wall, side walls, and an upper wall, the fuel tank body including a first storage portion, a second storage portion, and a coupling portion, the coupling portion communicating an upper portion of the first storage portion and an upper portion of the second storage portion; a pump module disposed in the first storage portion; an open portion formed in the first storage portion; a strut provided in the first storage portion; a separator provided on the strut; a suction portion disposed in the second storage portion; a fuel transfer line that communicates the suction portion to the pump module; a holding portion and a provisional holding portion provided at the separator, the provisional holding portion being configured to removably hold the extra-length portion of the fuel transfer line.

7 Claims, 10 Drawing Sheets

(51) Int. Cl.
*F02M 37/02* (2006.01)
*F02M 37/08* (2006.01)
*F02M 37/22* (2019.01)

(52) U.S. Cl.
CPC ...... *F02M 37/007* (2013.01); *F02M 37/0011* (2013.01); *F02M 37/02* (2013.01); *F02M 37/08* (2013.01); *F02M 37/22* (2013.01); *B60K 2015/0344* (2013.01); *B60K 2015/03125* (2013.01); *B60K 2015/03138* (2013.01); *B60K 2015/03144* (2013.01); *B60K 2015/03243* (2013.01); *B60K 2015/03493* (2013.01)

(58) Field of Classification Search
CPC ........... B60K 2015/03125; B60K 2015/03131; B60K 2015/03138; B60K 2015/03144; B60K 2015/03243; B60K 2015/0344; B60K 2015/03467
See application file for complete search history.

(56) References Cited

U.S. PATENT DOCUMENTS

| | | | |
|---|---|---|---|
| 6,138,859 A | 10/2000 | Aulph et al. | |
| 6,932,103 B2* | 8/2005 | Iwamoto | B60K 15/03 137/202 |
| 9,358,878 B2* | 6/2016 | Vreeken | B60K 15/077 |
| 2006/0102634 A1 | 5/2006 | Potter et al. | |
| 2009/0020162 A1* | 1/2009 | Nederegger | F02M 37/0017 137/147 |
| 2009/0230133 A1* | 9/2009 | Takeuchi | B29C 49/20 220/562 |
| 2012/0138606 A1 | 6/2012 | Varga | |
| 2014/0014663 A1 | 1/2014 | Eulitz et al. | |
| 2014/0110038 A1 | 4/2014 | Criel et al. | |
| 2014/0158696 A1 | 6/2014 | Criel et al. | |
| 2014/0197174 A1 | 7/2014 | Boecker et al. | |
| 2014/0305936 A1 | 10/2014 | Gebert et al. | |
| 2015/0344183 A1* | 12/2015 | Quant | B60K 15/03177 220/567.2 |
| 2017/0356408 A1* | 12/2017 | Yang | F02M 37/0047 |

FOREIGN PATENT DOCUMENTS

| | | |
|---|---|---|
| JP | 3-88829 U | 9/1991 |
| JP | 2008-69712 | 3/2008 |
| JP | 2009-209876 | 9/2009 |
| JP | 2014-516327 | 7/2014 |
| JP | 2014-141246 | 8/2014 |
| JP | 2015-504386 | 2/2015 |
| WO | WO 2014/053285 A1 | 4/2014 |
| WO | WO 2014/131685 A2 | 9/2014 |
| WO | WO 2014/131686 A2 | 9/2014 |
| WO | WO 2015/032924 A1 | 3/2015 |

* cited by examiner

FUEL TANK

CROSS-REFERENCE TO RELATED APPLICATION

This application is based on and claims priority under 35 USC 119 from Japanese Patent Application No. 2017-207160 filed on Oct. 26, 2017, the disclosure of which is incorporated by reference herein.

BACKGROUND

Technical Field

The present disclosure relates to a fuel tank.

Related Art

Saddle fuel tanks provided, for example, on the vehicle lower side of a floor panel and disposed so as to straddle an exhaust pipe are used as fuel tanks. A saddle fuel tank has a pair of storage portions, which are provided on the right and left sides of the exhaust pipe, and a coupling portion, which is disposed on the upper portion of the exhaust pipe and intercouples (intercommunicates) the pair of storage portions (e.g., see Japanese Patent Application Laid-open (JP-A) No. 2008-69712).

In a saddle fuel tank, a fuel supply pump for supplying fuel to the engine is provided in one of the storage portions, so a fuel transfer line that moves the fuel from the other storage portion to the one storage portion is provided. There are saddle fuel tanks in which a fuel transfer pump is provided for this purpose of transferring fuel. A saddle fuel tank that facilitates the manufacture of the fuel tank by providing the fuel transfer pump in one of the storage portions together with the fuel supply pump has been proposed (see JP-A No. 2008-69712).

Even in the case of the related art described above, if the fuel tank is a resin fuel tank, it becomes necessary to dispose the fuel transfer line inside the fuel tank at the time of molding, pull out the end portion of the fuel transfer line through an open portion to the outside of the fuel tank after molding, and connect the end portion of the fuel transfer line to a pump module.

The fuel transfer line needs an extra-length portion that is longer than the requisite length for installation in order to pull out the fuel transfer line through the open portion to the outside of the fuel tank when connecting the fuel transfer line to the pump module.

There has been the concern that this extra-length portion will contact molten resin when molding the fuel tank.

SUMMARY

In consideration of the circumstances described above, the present disclosure provides a saddle fuel tank made of resin that has excellent assembly workability and prevents or restrains the fuel transfer line from contacting molten resin at the time of molding.

A fuel tank made of resin pertaining to a first aspect of the disclosure includes: a fuel tank body that is enclosed by a bottom wall, side walls, and an upper wall, and that is configured to store fuel, the fuel tank body including a first storage portion, a second storage portion, and a coupling portion, the coupling portion communicating an upper portion of the first storage portion and an upper portion of the second storage portion; a pump module that is disposed in the first storage portion and that is configured to supply fuel to outside of the fuel tank body; an open portion that is formed in the first storage portion and through which the pump module is insertable; a strut that is provided in the first storage portion and that extends from at least one of the upper wall or the bottom wall toward the other; a separator that is disposed in the first storage portion and is provided on the strut; a suction portion that is disposed in the second storage portion and that is configured to suck in fuel stored in the second storage portion; a fuel transfer line that is flexible, that communicates the suction portion to the pump module, and that has an extra-length portion that is longer than a requisite length for installation from the suction portion to the pump module; a holding portion that is provided at the separator and that is configured to hold the fuel transfer line; and a provisional holding portion that is provided at the separator and that is configured to removably hold the extra-length portion of the fuel transfer line.

In the saddle fuel tank formed in this way, the strut that extends from at least one of the upper wall and the bottom wall to the other is provided in the first storage portion. The holding portion that holds the fuel transfer line and the provisional holding portion that is capable of removably holding the extra-length portion of the fuel transfer line are provided in the separator provided on the strut.

Consequently, when molding the fuel tank made of resin, the molds are temporarily opened after blow molding, the fuel transfer line, the strut, and the separator are disposed between molten resin pieces (parisons) formed in the plural molds, and the molds are reclosed, whereby the fuel tank is molded. At this time, the first storage portion side of the fuel transfer line is held by the holding portion of the separator, and the extra-length portion on the distal end side is held by the provisional holding portion.

Consequently, when molding the fuel tank, the fuel transfer line—and particularly the extra-length portion on the distal end side of the position where the fuel transfer line is held by the holding portion in the first storage portion is held by the provisional holding portion and is prevented or restrained from contacting molten resin.

After the fuel tank has cooled and hardened, a worker inserts his/her hand through the open portion into the inside of the first storage portion, removes the extra-length portion of the fuel transfer line from the provisional holding portion of the separator, and pulls out the extra-length portion of the fuel transfer line through the open portion to the outside of the fuel tank body to thereby connect it to the pump module. Moreover, the worker inserts the pump module through the open portion and disposes it inside the first storage portion, whereby the installation of the fuel transfer line is completed.

A fuel tank pertaining to a second aspect of the disclosure is the fuel tank of the first aspect, wherein the strut is connected to the upper wall and the bottom wall.

In this fuel tank, the strut provided in the first storage portion is connected to the upper wall and the bottom wall. Consequently, the upper wall and the bottom wall of the first storage portion are restrained from being deformed by changes in the internal pressure of the fuel tank body.

In this way, by providing the separator on the strut provided for restraining deformation of the fuel tank, it becomes unnecessary to provide a separate strut for the separator, and the number of parts can be reduced.

A fuel tank pertaining to a third aspect of the disclosure is the fuel tank of the first or second aspect, wherein an upper end of the strut is connected to an attachment portion that is formed at the upper wall and that projects in a vehicle downward direction, and the provisional holding portion is positioned further in the vehicle upward direction than the upper end of the strut.

In the fuel tank formed in this way, the attachment portion formed projecting in the vehicle downward direction is provided on the upper wall of the fuel tank body, and the upper end of the strut is connected to the attachment portion. The upper end of the strut is positioned further in the vehicle downward direction than the upper wall of the fuel tank body (excluding the attachment portion). However, because the provisional holding portion provided in the separator is positioned further in the vehicle upward direction than the upper end of the strut, the provisional holding portion is positioned in proximity to the upper wall (excluding the attachment portion). Consequently, when assembling the pump module to the fuel tank body, it is easy for the worker to insert his/her hand through the open portion and remove the extra-length portion of the fuel transfer line from the provisional holding portion. That is, assembly workability is excellent.

A fuel tank pertaining to a fourth aspect of the disclosure is the fuel tank of any one of the first to third aspects, wherein the provisional holding portion is a cutout that has an introduction passage extending from an end portion of the separator to an inside of the separator and a catch passage extending from an inner end portion of the introduction passage in a direction away from the holding portion.

In the saddle fuel tank formed in this way, when molding the fuel tank, the worker causes the portion (the extra-length portion) of the flexible fuel transfer line on the distal end side of the position where the fuel transfer line is held by the holding portion to flex, inserts the extra-length portion into the introduction passage from the end portion of the cutout formed as the provisional holding portion in the separator, and inserts the extra-length portion from the introduction passage to the far side of the catch passage (the end portion on the side in the direction away from the holding portion). At this time, the fuel transfer line (the extra-length portion) is urged in the direction away from the holding portion by elasticity resulting from flexural deformation, so the fuel transfer line (the extra-length portion) becomes caught in the catch passage of the cutout (the provisional holding portion).

When installing the pump module after molding the fuel tank, the worker inserts his/her hand through the open portion and removes the extra-length portion of the fuel transfer line inserted into the cutout. At this time, the fuel transfer line is simply caught in the cutout because of the elastic force of flexural deformation, so the fuel transfer line can be easily removed.

A fuel tank pertaining to a fifth aspect of the disclosure is the fuel tank of any one of the first to fourth aspects, wherein the separator is equipped with a first plate portion formed on an opposite side of a coupling portion side of the strut and a second plate portion formed on the coupling portion side of the strut, the provisional holding portion is provided at the first plate portion, and the holding portion is provided at the second plate portion.

In the saddle fuel tank formed in this way, the holding portion of the separator is provided in the second plate portion on the coupling portion side of the strut, and the provisional holding portion of the separator is provided in the first plate portion on the opposite side of the coupling portion side of the strut. Consequently, the requisite length for installation from the suction portion to the holding portion can be restrained.

Furthermore, in a case where a projecting portion is formed on the upper portion of the strut, interference (contact) with the attachment portion can be easily avoided by causing the fuel transfer line to flex from the holding portion toward the provisional holding portion because the holding portion and the provisional holding portion are positioned on opposite sides from each other across the strut.

The fuel tanks of the first and fifth aspects of the disclosure are given the configurations described above, so the fuel transfer line is prevented or restrained from contacting molten resin at the time of molding, and assembly workability is excellent.

The fuel tank of the second aspect of the disclosure is given the configuration described above, so the number of parts can be reduced.

The fuel tanks of the third and fourth aspects of the disclosure are given the configurations described above, so assembly workability is excellent.

BRIEF DESCRIPTION OF THE DRAWINGS

An exemplary embodiment of the present disclosure will be described in detail based on the following figures, wherein.

DETAILED DESCRIPTION

Figure 1:
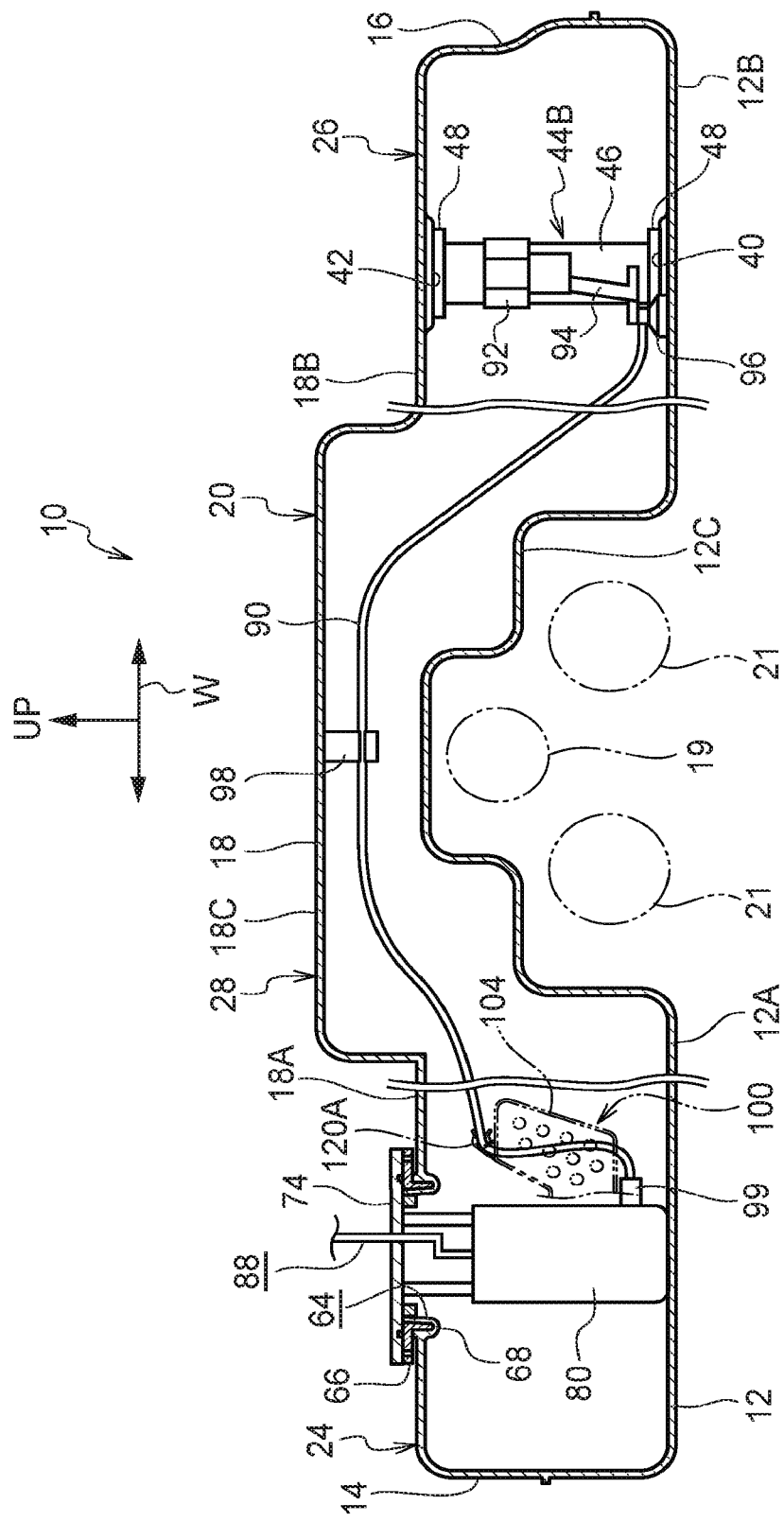
FIG. 1 is a sectional view along line A-A of FIG. 2.

A fuel tank 10 pertaining to an embodiment of the disclosure will be described with reference to FIG. 1 to FIG. 10. In connection with the following description, arrow FR in the drawings indicates a vehicle forward direction, arrow UP in the drawings indicates a vehicle upward direction, and arrow W in the drawings indicates a vehicle width direction.

(Configuration)

First, the overall fuel tank 10 will be described with reference to FIG. 1. The fuel tank 10 has a fuel tank body 20 equipped with a bottom wall 12 that extends in the vehicle width direction, a left wall 14 and a right wall 16 that extend in the vehicle upward direction from both vehicle width direction end portions of the bottom wall 12, and an upper wall 18 that joins the upper ends of the left wall 14 and the right wall 16 to each other and extends in the vehicle width direction. The fuel tank body 20 is closed off by the bottom wall 12, side walls including the left wall 14 and the right wall 16, and the upper wall 18 and can store fuel inside.

The bottom wall 12 has a raised portion 22 where the vehicle width direction central portion of the bottom wall 12 projects in the vehicle upward direction in order to avoid a drive shaft 19 and exhaust pipes 21 of the vehicle. That is, the fuel tank 10 is a saddle fuel tank. Furthermore, the fuel tank 10 is a resin fuel tank molded from resin. The driveshaft 19 and the exhaust pipes 21 are shown only in FIG. 1 and are not shown in other drawings.

The inside of the fuel tank body 20 is divided into a first storage portion 24 that is positioned on the vehicle width direction left side of the raised portion 22, a second storage portion 26 that is positioned on the vehicle width direction right side of the raised portion 22, and a coupling portion 28 that intercouples (intercommunicates) the first storage portion 24 and the second storage portion 26.

The portions of the bottom wall 12 and the upper wall 18 that configure the first storage portion 24 will be called a first bottom wall portion 12A and a first upper wall portion 18A, respectively. The portions of the bottom wall 12 and the upper wall 18 that configure the second storage portion 26 will be called a second bottom wall portion 12B and a second upper wall portion 18B, respectively. The portions of the bottom wall 12 and the upper wall 18 that configure the coupling portion 28 will be called a third bottom wall portion 12C and a third upper wall portion 18C, respectively.

Figure 3:
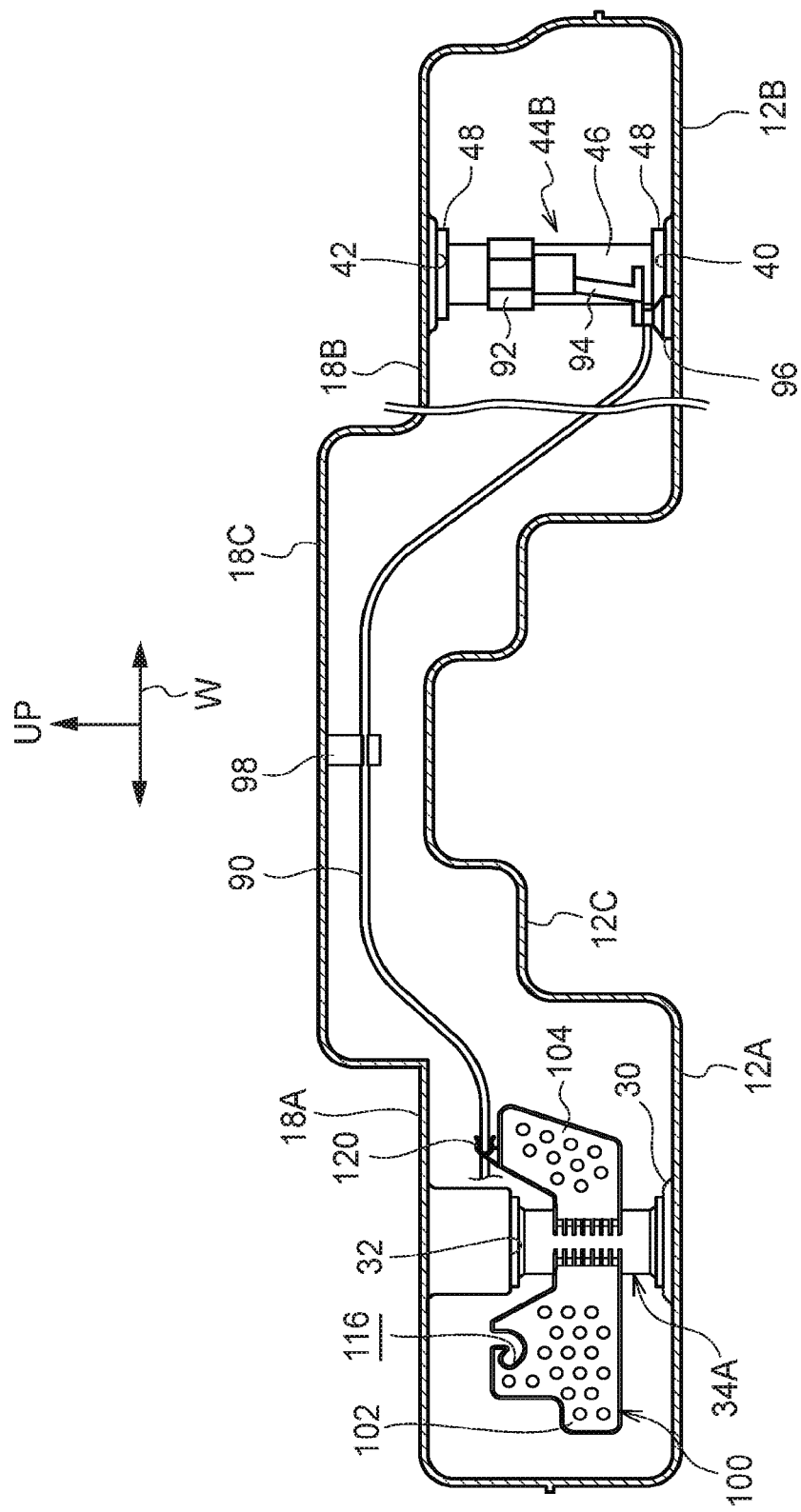
FIG. 3 is a sectional view along line B-B of FIG. 2.

In the first bottom wall portion 12A, as shown in FIG. 3, an attachment portion 30 that projects in the vehicle upward direction is formed. Furthermore, in the first upper wall portion 18A, an attachment portion 32 that projects in the vehicle downward direction is formed in a position corresponding to the attachment portion 30. A strut 34A that extends in the vehicle up and down direction is disposed between the attachment portions 30 and 32.

Figure 4:
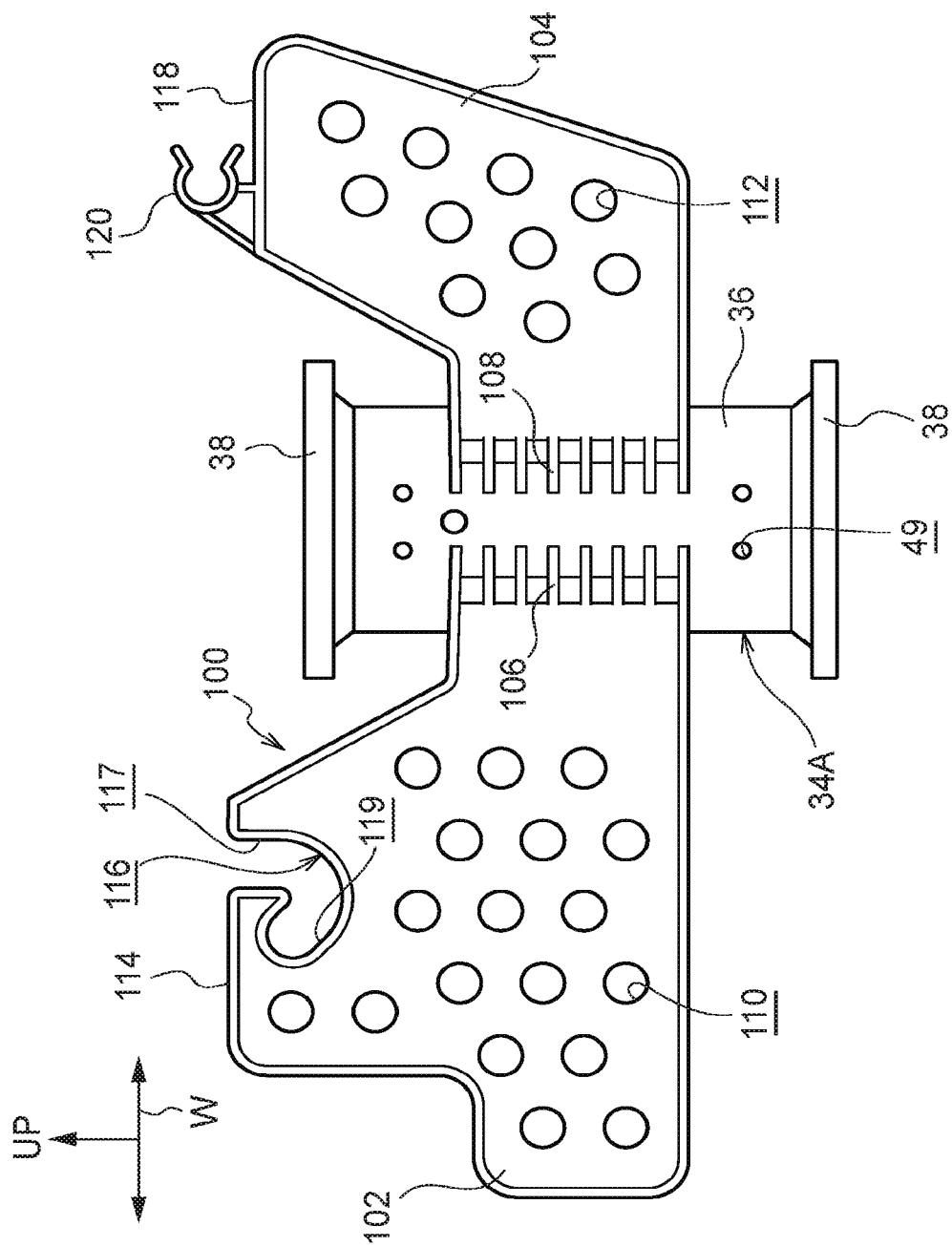
FIG. 4 is a front view showing a separator and a strut pertaining to the embodiment as seen from a vehicle rear side.

The strut 34A, as shown in FIG. 4, has a strut body 36 that is substantially cylindrical in shape and flange portions 38 that are formed projecting outward in the radial direction at both end portions of the strut body 36. The flange portions 38 are joined to the attachment portions 30 and 32, whereby the strut 34A is disposed between the first upper wall portion 18A and the first bottom wall portion 12A.

Furthermore, in the outer peripheral surface of the strut body 36 of the strut 34A, plural communicating holes 49 that intercommunicate the inside and the outside of the strut body 36 are formed.

Figure 2:
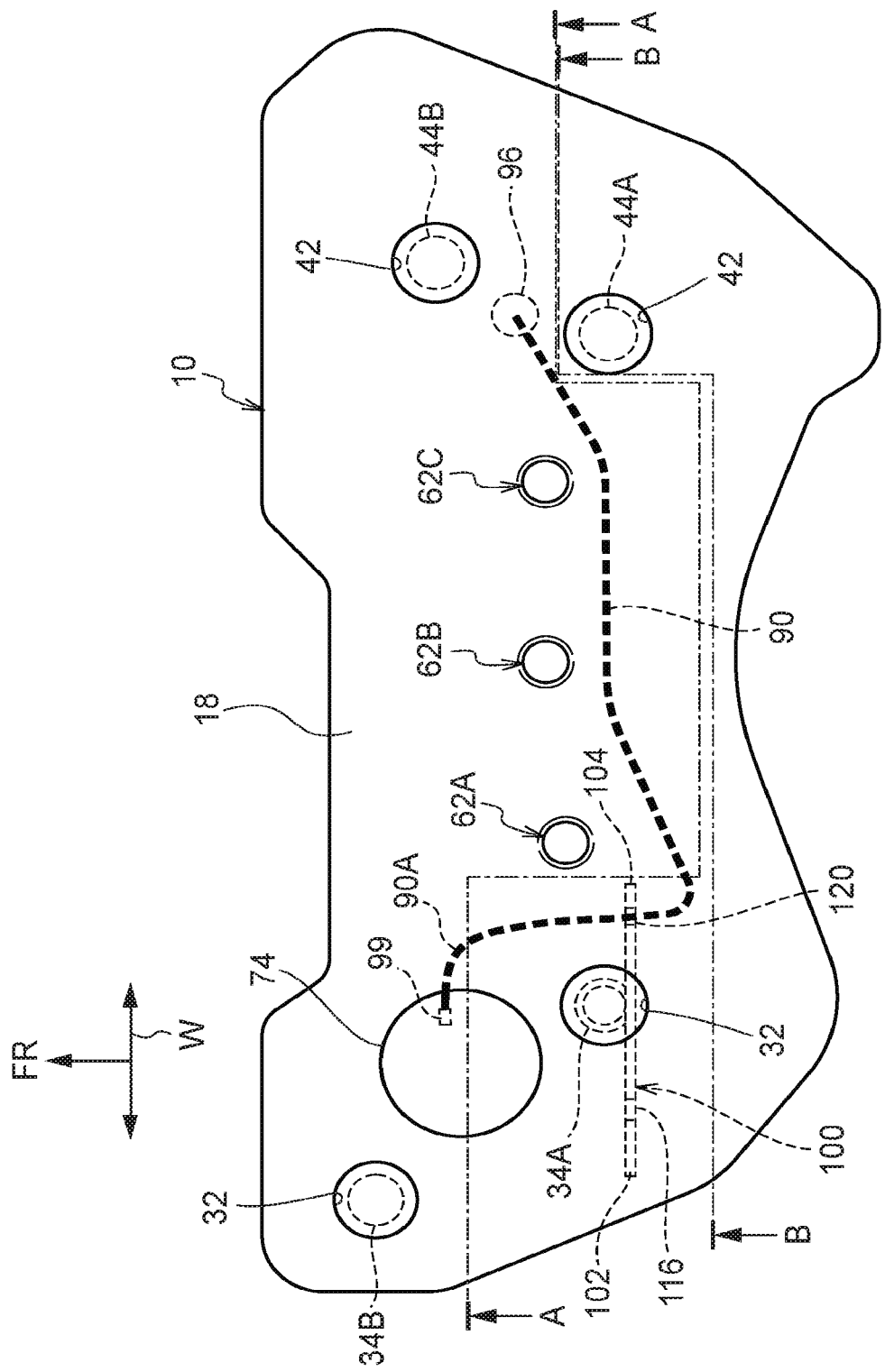
FIG. 2 is a plan view of a fuel tank pertaining to the embodiment.

As shown in FIG. 2, in the first storage portion 24, the strut 34A is disposed on the vehicle rear side and a strut 34B is disposed on the vehicle front side on the opposite side thereof across a later-described attachment hole portion 64.

A separator 100 is provided on the strut 34A. As shown in FIG. 3 and FIG. 4, the separator 100 has a first plate portion 102 that is provided extending outward in the vehicle width direction from the strut 34A and a second plate portion 104 that is provided extending inward in the vehicle width direction from the strut 34A. As shown in FIG. 4, the first plate portion 102 and the second plate portion 104 are connected via ribs 106 and 108, respectively, to the vehicle rear side of the outer peripheral surface of the strut 34A.

The first plate portion 102, as shown in FIG. 4, is formed in a substantially inverted T-shape whose vehicle width direction central portion projects in the vehicle upward direction as seen from the vehicle front and rear direction. The second plate portion 104 is formed in a substantially L-shape that extends obliquely in the vehicle upward direction from its vehicle width direction inner end portion as seen from the vehicle front and rear direction. In the first plate portion 102 and the second plate portion 104, respectively, pluralities of through holes 110 and 112 that extend in the vehicle front and rear direction are formed.

Moreover, a provisional holding portion 116 is formed in an upper end portion 114 of the first plate portion 102. The provisional holding portion 116 is a cutout formed in a substantially J-shape as seen from the vehicle rear side. Namely, the provisional holding portion 116 has an introduction passage 117, which extends in the vehicle downward direction from the upper end portion 114, and a catch passage 119, which extends in the vehicle upward direction heading outward in the vehicle width direction (a direction away from a later-described holding portion 120) while curving from the lower end of the introduction passage 117. The provisional holding portion 116 is positioned further in the vehicle upward direction than the upper end of the strut 34A.

An upper end portion 118 of the second plate portion 104 is positioned further in the vehicle upward direction than the upper end of the strut 34A. On the upper portion of the upper end portion 118, a holding portion 120 that accommodates and holds a fuel transfer line 90 inside a recessed portion by elastically deforming is formed.

A separator is not provided on the strut 34B, but the strut 34B has the same configuration as the strut 34A.

Furthermore, as shown in FIG. 2, as in the first storage portion 24, a pair of struts 44A and 44B that extend in the vehicle up and down direction are also disposed between the second bottom wall portion 12B and the second upper wall portion 18B of the second storage portion 26. The strut 44B, as shown in FIG. 1, like the strut 34A, has a strut body 46 that is substantially cylindrical in shape and flange portions 48 that are formed projecting outward in the radial direction at both end portions of the strut body 46. The flange portions 48 are joined to attachment portions 40 and 42, whereby the strut 44B is disposed between the second upper wall portion 18B and the second bottom wall portion 12B. The strut 44A has the same configuration as the strut 44B.

Moreover, as shown in FIG. 2, in the coupling portion 28, standoffs 62A to 62C, at which circular truncated cone-shaped projecting portions that project in the vehicle upward direction from the third bottom wall portion 12C and circular truncated cone-shaped projecting portions that project in the vehicle downward direction from the third upper wall portion 18C are joined to each other, are formed. That is, in the coupling portion 28, three standoffs 62A to 62C are formed a predetermined interval apart from each other in the vehicle width direction.

Furthermore, as shown in FIG. 1, in the first upper wall portion 18A of the first storage portion 24, an attachment hole portion 64 for attaching internal parts of the fuel tank 10 to the inside of the fuel tank body 20 is formed.

The attachment hole portion 64 is formed a little on the vehicle front side of the center of the first upper wall portion 18A. As shown in FIG. 1 and FIG. 2, the attachment hole portion 64 has a cylindrical support portion 68 and an insert ring 66 that is made of metal and is insert-molded in the support portion 68.

As shown in FIG. 1, a cover 74 is placed on the insert ring 66 and is fastened to the insert ring 66 by metal fittings (not shown in the drawings), whereby the attachment hole portion 64 is closed off.

As shown in FIG. 1, in the first storage portion 24, a pump module 80 is disposed on the vehicle lower side of the attachment hole portion 64.

A jet pump (not shown in the drawings) for sucking in, via the fuel transfer line 90, fuel on the second storage portion 26 side is provided inside the pump module 80. The end portion of the fuel transfer line 90 is connected to the jet pump.

The pump module 80 is also equipped with a fuel pump for supplying fuel to the outside. A fuel supply line 88 that supplies fuel from the fuel pump to the outside is provided extending through the cover 74 to the outside.

In the second storage portion 26, as shown in FIG. 1, a bracket 92 is attached to the strut 44B positioned on the vehicle front side. A filter portion 96, to which one end of the fuel transfer line 90 for supplying fuel from the second storage portion 26 to the pump module 80 in the first storage portion 24 is connected, is disposed on the distal end of an arm 94 that extends from the bracket 92 toward the second bottom wall portion 12B. As shown in FIG. 2, the filter portion 96 is disposed between the pair of struts 44A and 44B on top of the second bottom wall portion 12B of the second storage portion 26. The filter portion 96 corresponds to a suction portion.

The fuel transfer line 90, as shown in FIG. 1, interconnects (intercommunicates) the filter portion 96 and the pump module 80 (the jet pump). The fuel transfer line 90 is supported in its middle by a support portion 98 provided on the third upper wall portion 18C of the coupling portion 28 and is held by the holding portion 120 of the separator 100.

Figure 9:
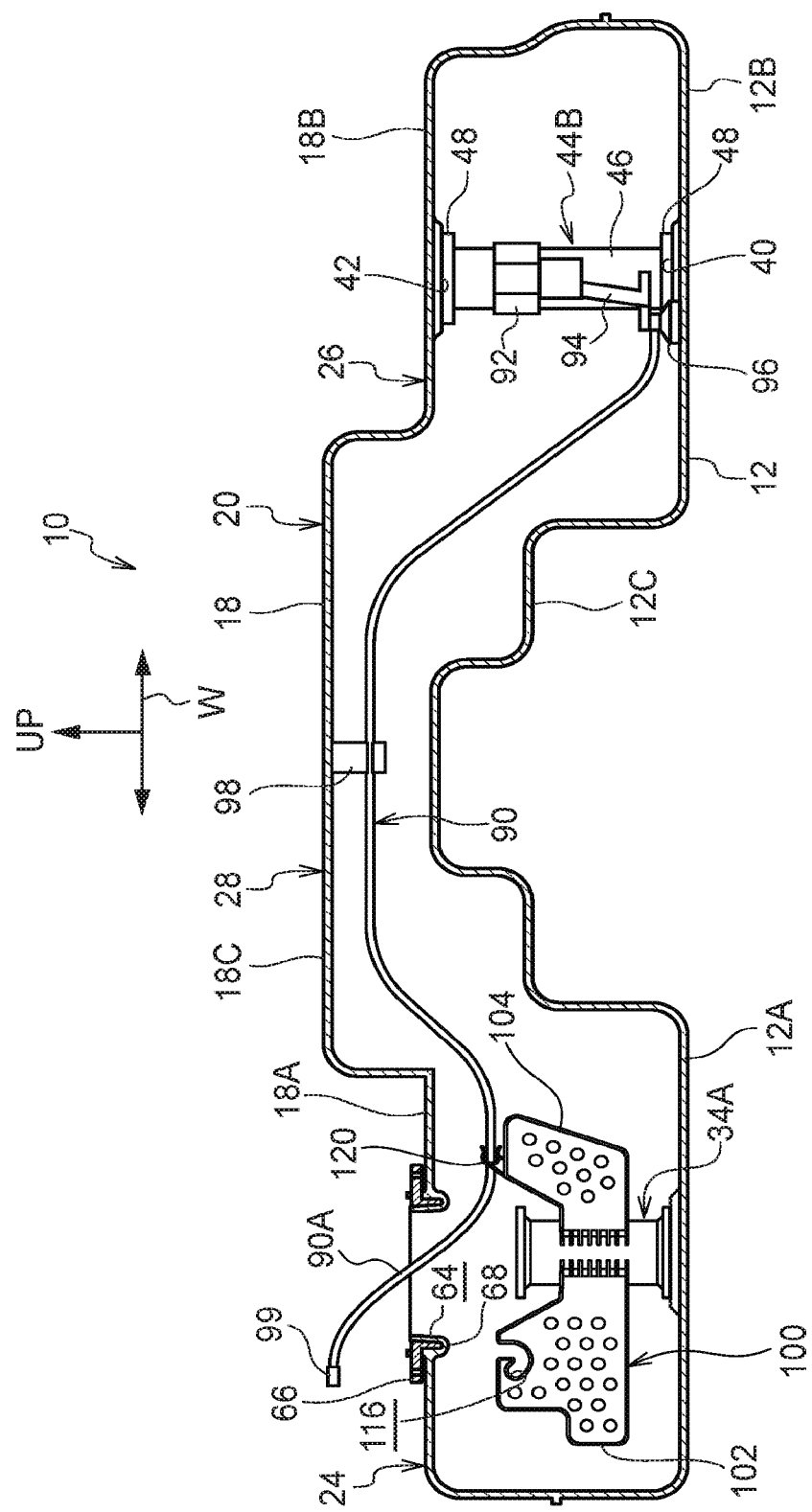
FIG. 9 is a schematic longitudinal sectional view showing the pulling-out of the fuel transfer line after molding the fuel tank pertaining to the embodiment.
Figure 10:
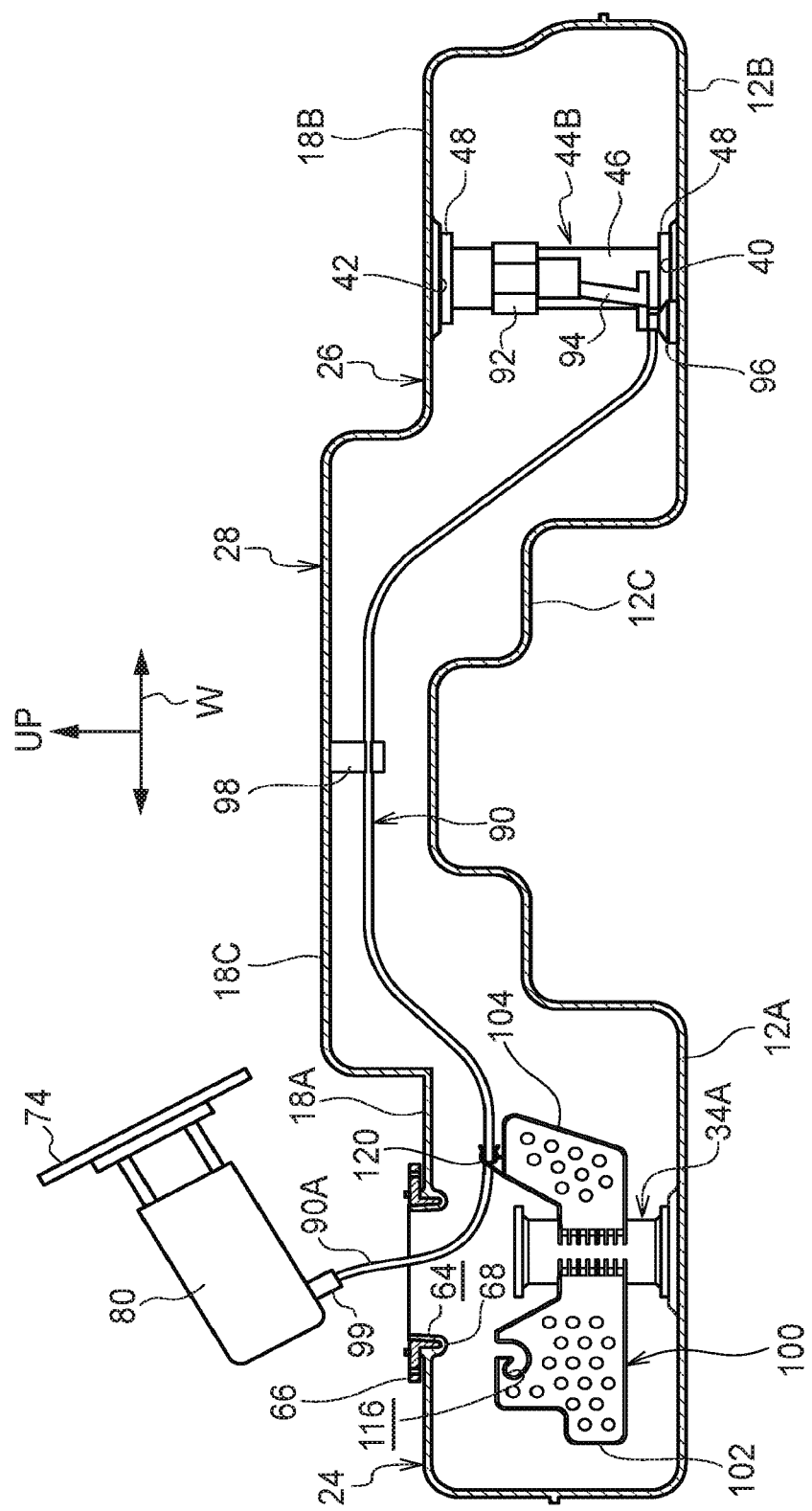
FIG. 10 is a schematic longitudinal sectional view showing the connection of the fuel transfer line to a pump module after molding the fuel tank pertaining to the embodiment.

Furthermore, as shown in FIG. 9 and FIG. 10, the end portion of the fuel transfer line 90 is pulled out through the attachment hole portion 64 to the outside and connected to the pump module 80 after molding the fuel tank 10, so the fuel transfer line 90 is formed longer than a requisite length for installation in the state shown in FIG. 1. The portion of the fuel transfer line 90 on the pump module 80 side that is longer than the requisite length for installation will be called an extra-length portion 90A. A connection portion 99 for connection to the pump module 80 is provided on the distal end of the extra-length portion 90A.

Figure 5:
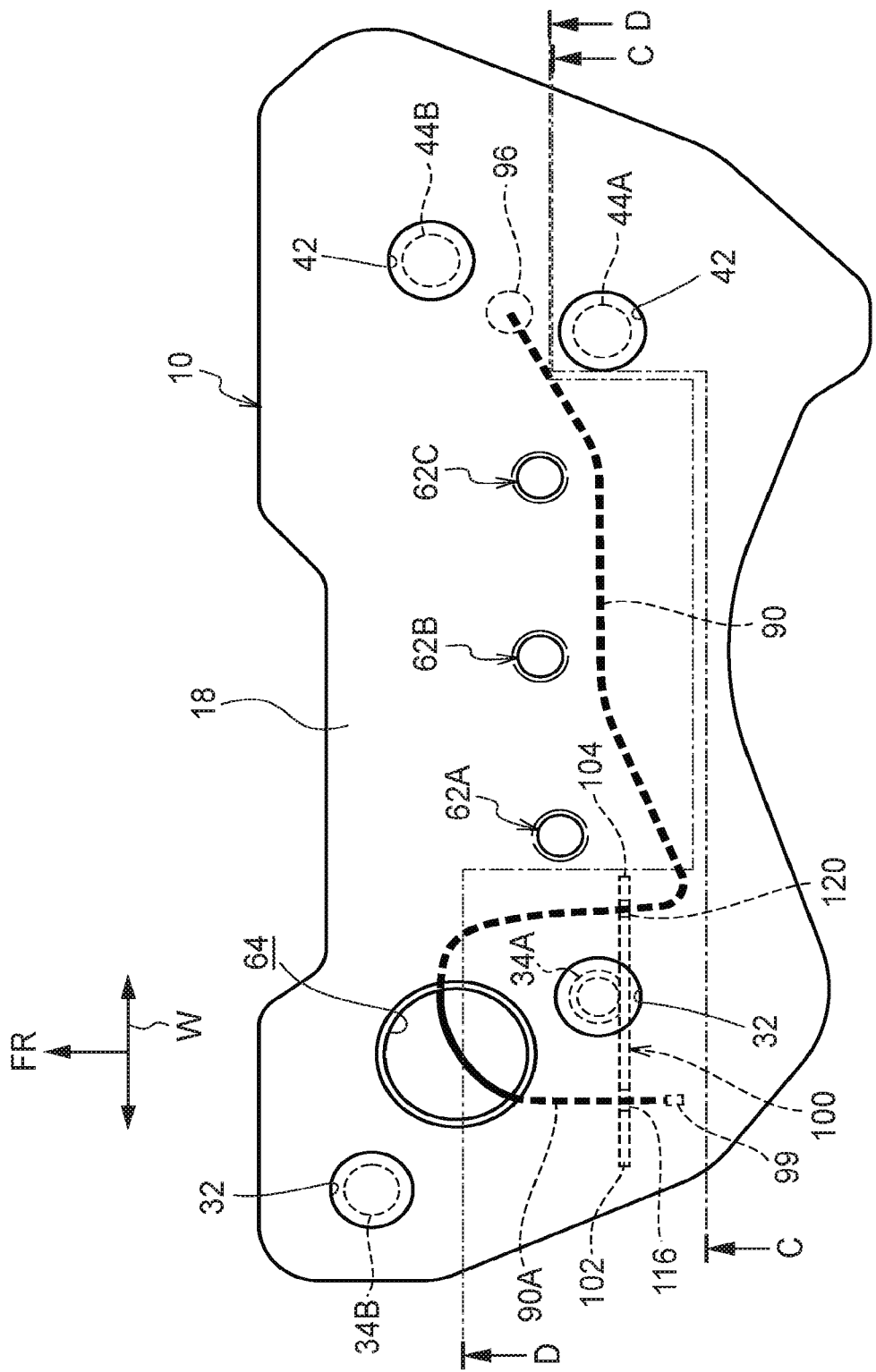
FIG. 5 is a plan view showing the placement of a fuel transfer line when molding the fuel tank pertaining to the embodiment.

The extra-length portion 90A is caught in the provisional holding portion 116 of the separator 100 when molding the fuel tank 10. That is, when the extra-length portion 90A of the fuel transfer line 90 is inserted into the provisional holding portion 116, as shown in FIG. 5, the extra-length portion 90A becomes curved counter-clockwise as seen in a plan view. The extra-length portion 90A is urged outward in the vehicle width direction (the direction away from the holding portion 120) and held (caught) in the provisional holding portion 116 (the catch passage 119) by elasticity resulting from the flexural deformation of the extra-length portion 90A.

(Assembly Process)

Next, the process of assembling the fuel tank 10 will be described.

When molding the fuel tank 10 made of resin, two molten resin pieces (parisons) are stuck to a first mold and a second mold and blow-molded. Thereafter, the first mold and the second mold are temporarily opened, and the internal parts of the fuel tank 10 are disposed between the two molten resin pieces that have been formed. Namely, the struts 34A, 34B, 44A, and 44B, the separator 100, the filter portion 96, and the fuel transfer line 90 are disposed. After this, the first mold and the second mold are reclosed, whereby the fuel tank 10 having the separator 100 and the fuel transfer line 90 disposed inside is molded.

Figure 6:
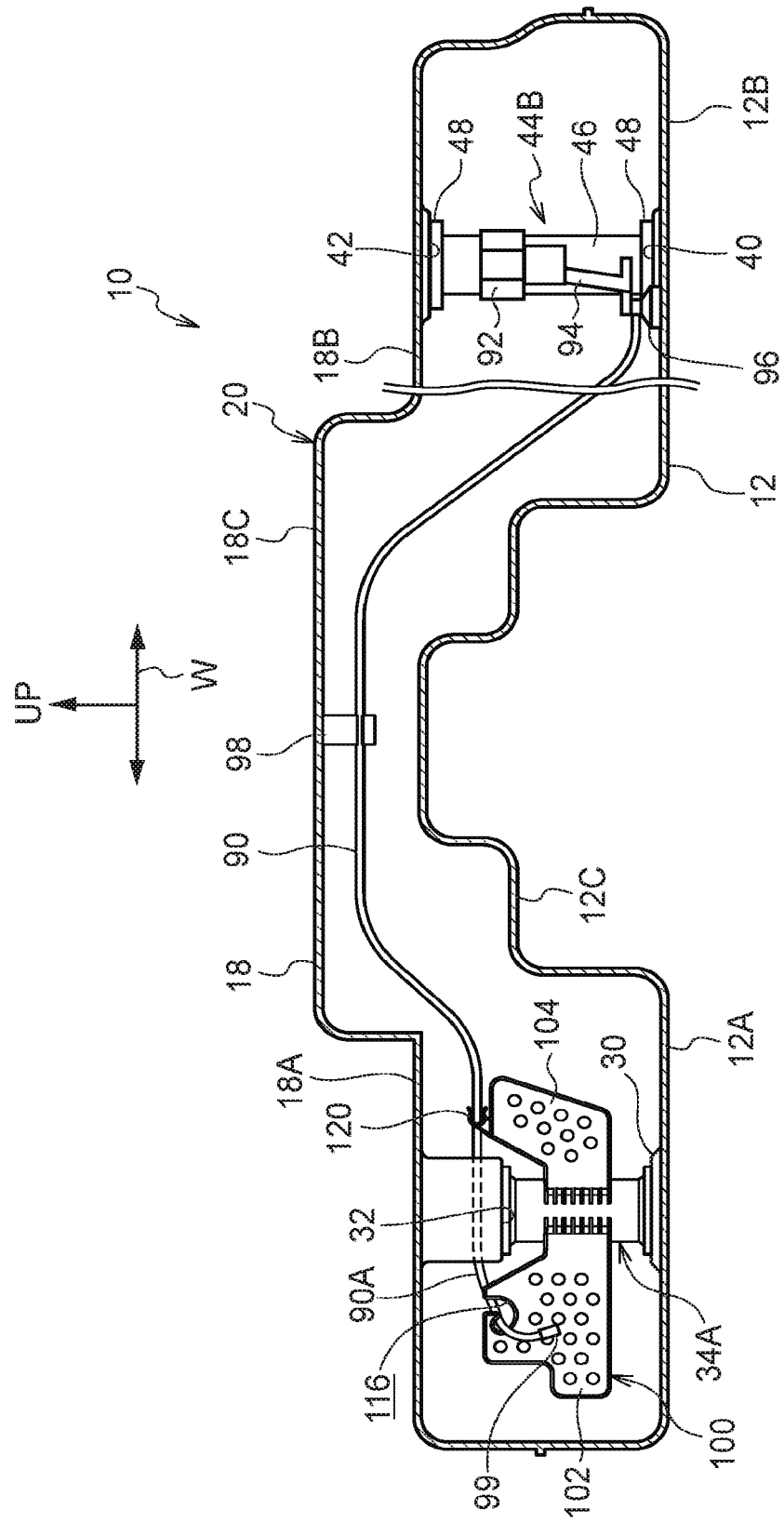
FIG. 6 is a sectional view along line C-C of FIG. 5.

At this time, as shown in FIG. 6, the fuel transfer line 90 is disposed in such a way as to extend from the upper portion of the filter portion 96 disposed on the second bottom wall portion 12B of the second storage portion 26 of the fuel tank 10 via the support portion 98 provided on the third upper wall portion 18C of the coupling portion 28 to the holding portion 120 of the separator 100. That is, the fuel transfer line 90 is disposed in such a way that it does not abut against (contact) the bottom wall 12 (the first bottom wall portion 12A to the third bottom wall portion 12C) or the upper wall 18 (the first upper wall portion 18A to the third upper wall portion 18C) of the fuel tank body 20 from the filter portion 96 in the second storage portion 26 via the coupling portion 28 to the separator 100 in the first storage portion 24.

Furthermore, as shown in FIG. 5, the portion of the fuel transfer line 90 between the holding portion 120 and the provisional holding portion 116 of the separator 100 is curved in the vehicle forward direction, and the fuel transfer line 90 is disposed running along the vehicle lower side of the attachment hole portion 64, so a situation where the fuel transfer line 90 (the extra-length portion 90A) from the holding portion 120 to the provisional holding portion 116 interferes with the attachment portion 32 of the first upper wall portion 18A positioned on the vehicle upper side of the strut 34A is avoided.

Moreover, the extra-length portion 90A is urged outward in the vehicle width direction inside the catch passage 119 of the provisional holding portion 116 and is reliably held (caught) in the provisional holding portion 116 by elasticity resulting from the curving of the extra-length portion 90A.

Figure 7:
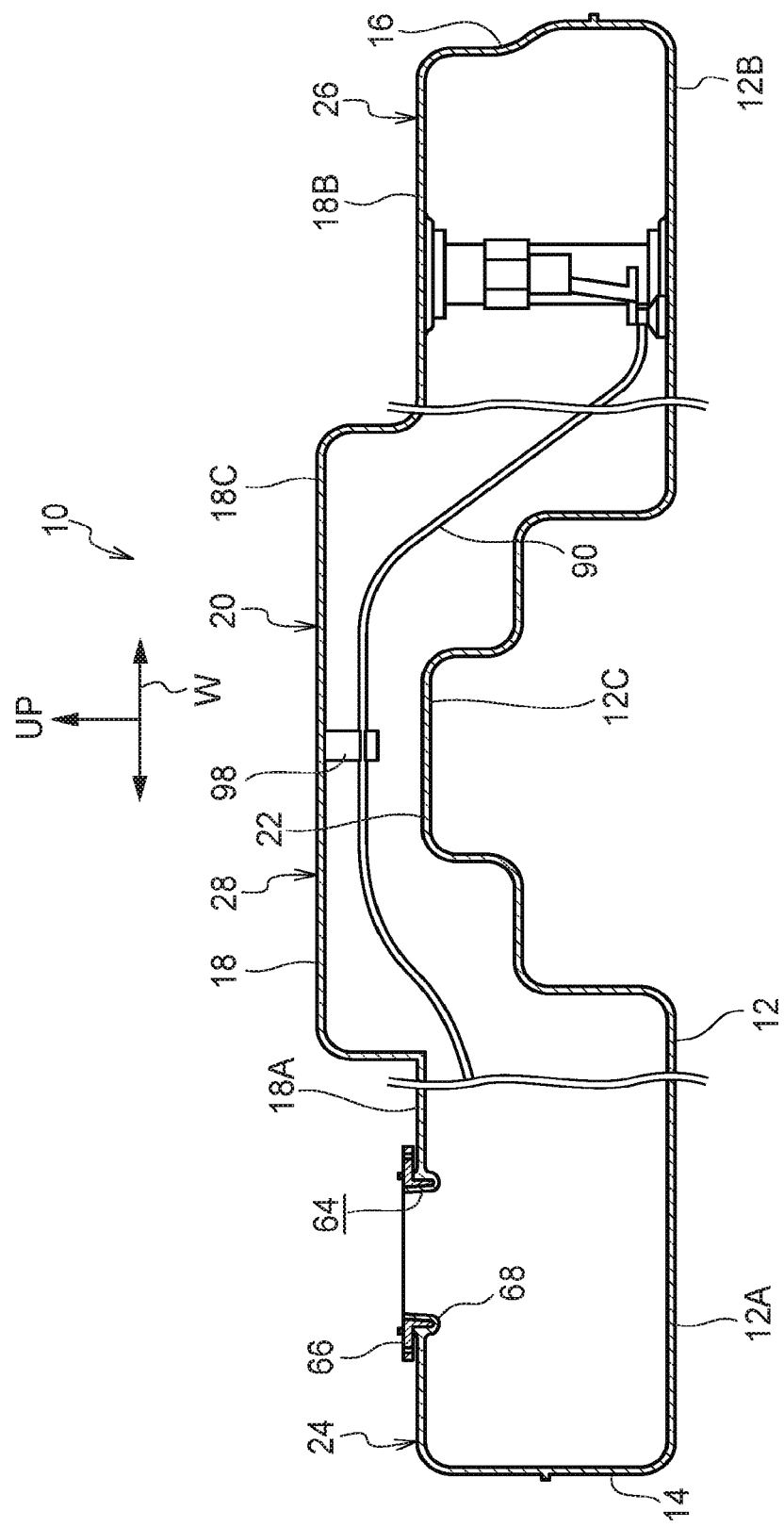
FIG. 7 is a sectional view along line D-D of FIG. 5.

In this state, as shown in FIG. 7, the pump module 80 is not yet disposed inside the fuel tank body 20.

Next, attachment of the pump module 80 is performed after the molded fuel tank 10 has sufficiently cooled and the bottom wall 12, the side walls (the left wall 14, the right wall 16, etc.), and the upper wall 18 of the fuel tank body 20 have hardened.

Figure 8:
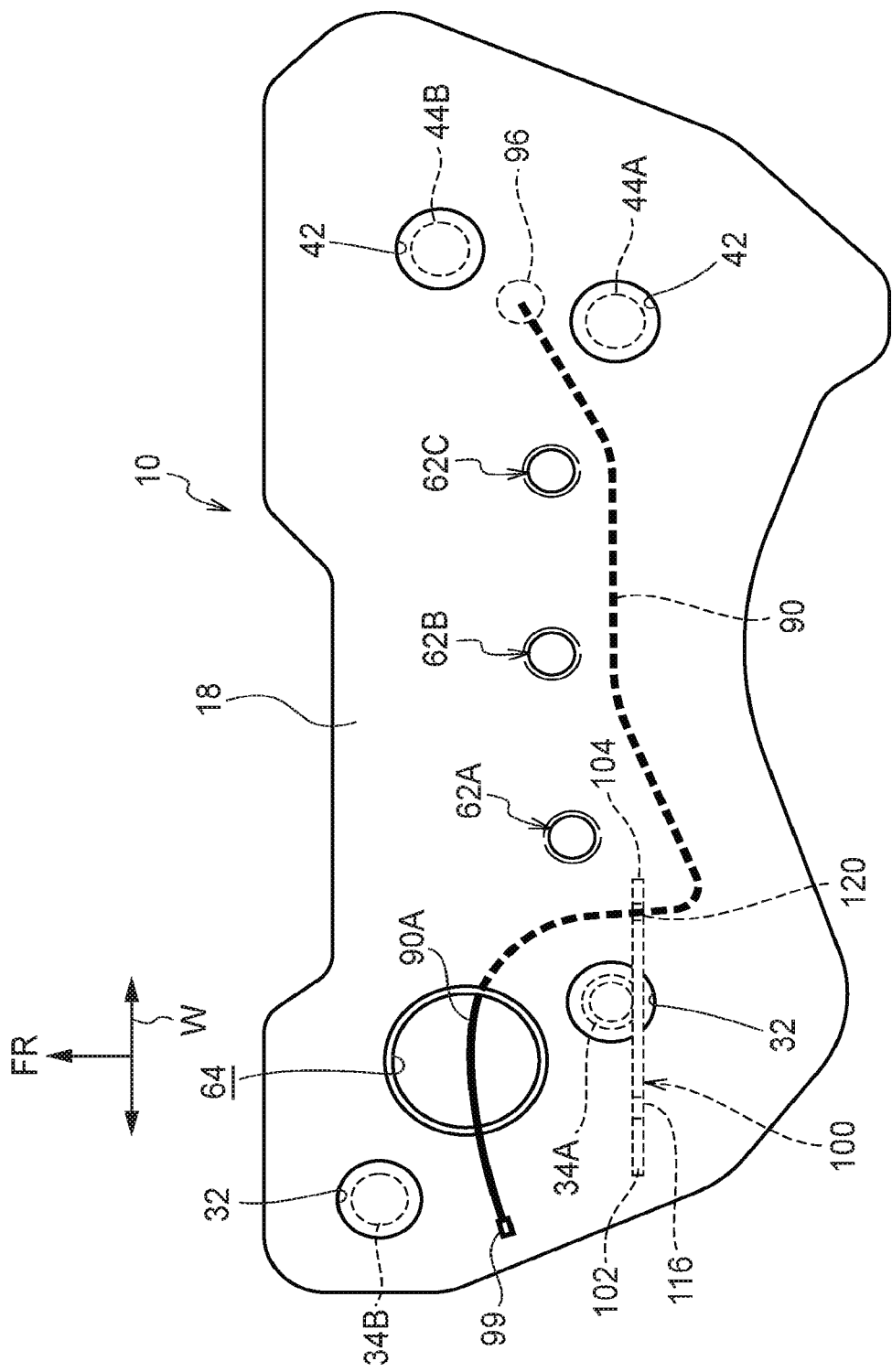
FIG. 8 is a plan view showing the pulling-out of the fuel transfer line after molding the fuel tank pertaining to the embodiment.

A worker inserts his/her hand through the attachment hole portion 64 into the inside of the fuel tank body 20 in the state shown in FIG. 5 and FIG. 6 and removes, from the provisional holding portion 116 of the separator 100, the extra-length portion 90A of the fuel transfer line 90 that had been caught in the provisional holding portion 116. Specifically, the extra-length portion 90A can be removed from the provisional holding portion 116 (the catch passage 119 and the introduction passage 117) by simply deforming the flexible fuel transfer line 90. Then, as shown in FIG. 8 and FIG. 9, the worker pulls out the removed extra-length portion 90A through the attachment hole portion 64 to the outside.

Next, as shown in FIG. 10, the worker connects the connection portion 99 of the fuel transfer line 90 (the extra-length portion 90A) to the pump module 80 at the upper portion of the attachment hole portion 64 of the fuel tank body 20. Because of this, the fuel transfer line 90 is connected to the jet pump (not shown in the drawings) of the pump module 80.

Lastly, as shown in FIG. 1, the worker inserts the pump module 80 through the attachment hole portion 64 into the inside of the fuel tank body 20, installs the cover 74 on top of the insert ring 66 of the attachment hole portion 64, fastens the cover 74 to the insert ring 66 with fasteners (not shown in the drawings), and closes off the attachment hole portion 64. By attaching the cover 74, the pump module 80 is installed on top of the first bottom wall portion 12A of the first storage portion 24.

At this time, the fuel transfer line 90 remains held by the holding portion 120 of the separator 100, so the installation situation from the holding portion 120 to the filter portion 96 is maintained.

(Operation)

Next, the operation of the fuel tank 10 pertaining to the embodiment will be described.

In the saddle fuel tank 10 made of resin, the holding portion 120 that holds the fuel transfer line 90 and the provisional holding portion 116 that is capable of removably holding the extra-length portion 90A of the fuel transfer line 90 are formed in the separator 100 disposed in the first storage portion 24 in which the pump module 80 including the fuel pump that supplies fuel to the outside is disposed.

Consequently, the end portion on the first storage portion 24 side of the fuel transfer line 90 disposed inside the fuel tank body 20 that is molded in a state in which the pump module 80 is not inside the fuel tank body 20 is held by the holding portion 120 and the provisional holding portion 116 of the separator 100 when molding the fuel tank 10, so the fuel transfer line 90 is prevented or restrained from contacting the first bottom wall portion 12A, the first upper wall portion 18A, and so forth of the first storage portion 24. That is, the fuel transfer line 90 is prevented or restrained from contacting the first bottom wall portion 12A, the first upper wall portion 18A, and so forth of the fuel tank body 20 (molten resin) when molding the fuel tank 10.

In particular, the extra-length portion 90A that is longer than the requisite length for installation is provided on the end portion of the fuel transfer line 90, which is the distal end on the first storage portion 24 side, in order to pull out the end portion of the fuel transfer line 90 through the attachment hole portion 64 to the outside and connect the end portion of the fuel transfer line 90 to the pump module 80 after the fuel tank body 20 has been molded. If the extra-length portion 90A is not supported inside the fuel tank body 20 when molding the fuel tank 10, there is the concern that the extra-length portion 90A will contact the first bottom wall portion 12A, the first upper wall portion 18A, and so forth that are hot molten resin. However, because the extra-length portion 90A is supported by the provisional holding portion 116 of the separator 100 when molding the fuel tank 10, the extra-length portion 90A can be prevented or restrained from contacting the molten resin.

Furthermore, the fuel transfer line 90 that is installed inside the fuel tank body 20 when molding the fuel tank 10 is supported from the upper portion of the filter portion 96 installed on the second bottom wall portion 12B of the second storage portion 26 by the support portion 98 provided on the third upper wall portion 18C of the coupling portion 28 and is held by the holding portion 120 provided in the upper portion of the separator 100 in the first storage portion 24. That is, in the fuel tank body 20 of the saddle fuel tank 10, the fuel transfer line 90 extends from the second bottom wall portion 12B side of the second storage portion 26 via the third upper wall portion 18C side of the coupling portion 28 to the holding portion 120 provided on the upper portion side of the separator 100 attached to the strut 34A in the first storage portion 24, so the fuel transfer line 90 is prevented or restrained from contacting the bottom wall 12, the upper wall 18, and so forth when molding the fuel tank 10.

Moreover, the provisional holding portion 116 is positioned further in the vehicle upward direction than the upper end of the strut 34A (on the vehicle width direction outer side of the attachment portion 32), so the provisional holding portion 116 is in a position in proximity to the first upper wall portion 18A, and the worker can easily take hold of the extra-length portion 90A of the fuel transfer line 90 when the worker inserts his/her hand through the attachment hole portion 64 into the inside of the fuel tank body 20. In particular, because the provisional holding portion 116 is positioned on the vehicle width direction outer side of the attachment portion 32 of the first upper wall portion 18A, it is not necessary for the worker to reach his/her hand deep to the vehicle lower side of the attachment portion 32 in order to remove the extra-length portion 90A from the provisional holding portion 116. That is, assembly workability is excellent.

Furthermore, the first plate portion 102 of the separator 100 is formed on the vehicle width direction outer side of the strut 34A, and the second plate portion 104 of the separator 100 is formed on the vehicle width direction inner side of the strut 34A. Consequently, by providing the holding portion 120 in the second plate portion 104 and providing the provisional holding portion 116 in the first plate portion 102, the holding portion 120 can be disposed on the side nearer to the second storage portion 26 and the provisional holding portion 116 can be disposed on the side farther away from the second storage portion 26. Because of this, the requisite length for installation from the filter portion 96 to the holding portion 120 can be set short.

Moreover, the holding portion 120 and the provisional holding portion 116 of the separator 100 are provided on opposite sides from each other across the strut 34A as seen in a plan view, so by simply causing the flexible fuel transfer line 90 (the extra-length portion 90A) to flex in the vehicle front and rear direction from the holding portion 120 positioned further in the vehicle upward direction than the strut 34A toward the provisional holding portion 116, a situation where the fuel transfer line 90 (the extra-length portion 90A) interferes with the attachment portion 32 can be easily avoided. That is, a situation where the fuel transfer line 90 (the extra-length portion 90A) contacts the attachment portion 32 (molten resin) when molding the fuel tank 10 can be easily avoided.

Furthermore, by causing the fuel transfer line 90 to flex in the vehicle forward direction from the holding portion 120 toward the provisional holding portion 116 when molding the fuel tank 10, the fuel transfer line 90 can be positioned on the vehicle lower side of the attachment hole portion 64, and the fuel transfer line 90 can be easily gripped when removing the extra-length portion 90A from the provisional holding portion 116.

Moreover, the provisional holding portion 116 is a cutout provided in the upper end portion 114 of the first plate portion 102 of the separator 100, and the fuel transfer line 90 is caught in the provisional holding portion 116 because of elasticity resulting from flexural deformation of the flexible fuel transfer line 90, so it is easy to take out (remove) the fuel transfer line 90 from the provisional holding portion 116. That is, assembly workability is excellent.

Moreover, the provisional holding portion 116 is J-shaped as seen from the vehicle rear side. Namely, the provisional holding portion 116 has the catch passage 119 that extends in a direction in which it slopes in the vehicle upward direction heading outward in the vehicle width direction from the lower end of the introduction passage 117. Consequently, the fuel transfer line 90 (the extra-length portion 90A) urged outward in the vehicle width direction by elasticity resulting from flexural deformation is reliably caught (held) in the catch passage 119. That is, by simply inserting the flexed end portion (the extra-length portion 90A) of the fuel transfer line 90 into the catch passage 119 from the introduction passage 117 of the provisional holding portion 116, the end portion (the extra-length portion 90A) of the fuel transfer line 90 can be easily made to catch in the provisional holding portion 116.

Furthermore, the extra-length portion 90A of the fuel transfer line 90 is held by the holding portion 20 even after molding the fuel tank 10. Consequently, even in a case where the extra-length portion 90A has been pulled out through the attachment hole portion 64 of the fuel tank body 20 when connecting the pump module 80, the installed state of the fuel transfer line 90 from the support portion 98 of the coupling portion 28 to the holding portion 120 of the separator 100 is maintained.

Moreover, in the saddle fuel tank 10 made of resin, by providing the struts 34A and 34B and the struts 44A and 44B in the first storage portion 24 and the second storage portion 26 where the distance between the upper wall 18 and the bottom wall 12 is large, deformation of the upper wall 18 and the bottom wall 12 is restrained. By providing the separator 100 on the strut 34A, it becomes unnecessary to provide a separate strut for the separator 100. That is, the number of parts can be reduced.

Furthermore, the holding portion 120 and the provisional holding portion 116 are provided in the upper portions of the first plate portion 102 and the second plate portion 104 of the separator 100, so it becomes unnecessary to provide separate parts for the holding portion 120 and the provisional holding portion 116, and the number of parts can be further reduced.

(Other)

In the fuel tank 10 of the embodiment, the separator 100 is provided on the strut 34A in the first storage portion 24, but the separator 100 is not limited to this. That is, the separator 100 may also be provided on the strut 34B.

Furthermore, the separator 100 is provided on the strut 34A for restraining deformation of the fuel tank body 20 (the first upper wall portion 18A and the first bottom wall portion 12A) that is, the strut 34A connected to the first upper wall portion 18A and the first bottom wall portion 12A but the separator 100 may also be provided on a different strut connected only to one of the first upper wall portion 18A and the first bottom wall portion 12A.

Moreover, the holding portion 120 and the provisional holding portion 116 are provided in the upper portion of the separator 100 and are disposed further in the vehicle upward direction than the upper end of the strut 34A, but the holding portion 120 and the provisional holding portion 116 are not limited to this. That is, the holding portion 120 and the provisional holding portion 116 may also be positioned further in the vehicle downward direction than the upper end of the strut 34A.

Furthermore, the provisional holding portion 116 is a cutout provided in the separator 100, and the extra-length portion 90A of the flexible fuel transfer line 90 becomes caught in the provisional holding portion 116 by inserting the extra-length portion 90A into the inside of the provisional holding portion 116, but the provisional holding portion 116 is not limited to this. For example, a provisional holding portion capable of elastically sandwiching and holding the extra-length portion 90A may also be provided, so that the extra-length portion 90A is sandwiched and held by that provisional holding portion.

Moreover, the provisional holding portion 116 is a cutout formed in a J-shape as seen from the vehicle rear side, but the provisional holding portion 116 is not limited to this. That is, it suffices for an introduction passage extending inward from the end portion of the separator 100 and a catch passage extending from the end portion of the introduction passage in the direction away from the holding portion 120 to be formed. This is because as long as the provisional holding portion 116 is formed in this way, the fuel transfer line 90 urged in the direction away from the holding portion 120 by elasticity resulting from flexural deformation becomes caught in the catch passage. Consequently, provided that this condition is met, the introduction passage and the catch passage may also face a single direction (be in a straight line) in the provisional holding portion 116.

What is claimed is:

1. A fuel tank made of resin, the fuel tank comprising:
   a fuel tank body that is enclosed by a bottom wall, side walls, and an upper wall, and that is configured to store fuel, the fuel tank body including a first storage portion, a second storage portion, and a coupling portion, the coupling portion communicating an upper portion of the first storage portion and an upper portion of the second storage portion;
   a pump module that is disposed in the first storage portion and that is configured to supply fuel to outside of the fuel tank body;
   an open portion that is formed in a first upper wall portion of the first storage portion and through which the pump module is insertable;
   a strut that is provided in the first storage portion and that extends from at least one of the upper wall or the bottom wall toward the other;
   a separator that is disposed in the first storage portion and is provided on the strut, the separator is equipped with a first plate portion formed on an opposite side of a coupling portion side of the strut and a second plate portion formed on the coupling portion side of the strut;
   a suction portion that is disposed the second storage portion and that is configured to suck in fuel stored in the second storage portion;
   a fuel transfer line that is flexible, that communicates the suction portion to the pump module, and that has an extra-length portion that is longer than a requisite length for installation from the suction portion to the pump module;
   a holding portion that is provided at an upper side of the second plate portion of the separator and that is configured to hold the fuel transfer line; and
   a provisional holding portion that is provided at an upper side of the first plate portion of the separator and that is configured to removably hold the extra-length portion of the fuel transfer line,
   wherein the provisional holding portion is a cutout that forms a substantially J-shape as seen from a vehicle rear side, the provisional holding portion having an introduction passage extending from the upper side of the first plate portion of the separator in a vehicle downward direction to an inside of the first plate portion of the separator and a catch passage extending in a vehicle upward direction heading outward in a vehicle width direction while curving from an inner end portion of the introduction passage, an end of the catch passage being below the upper side of the first plate portion of the separator.

2. The fuel tank according to claim 1, wherein the strut is connected to the upper wall and the bottom wall.

3. The fuel tank according to claim 1, wherein an upper end of the strut is connected to an attachment portion that is formed at the first upper wall portion and that projects in the vehicle downward direction, and the provisional holding portion is positioned further in the vehicle upward direction than the upper end of the strut.

4. The fuel tank according to claim 3,
   wherein the provisional holding portion is positioned on a vehicle width direction outer side of the attachment portion formed at the first upper wall portion.

5. The fuel tank according to claim 1, wherein:
   at the bottom wall, a first attachment portion that projects in the vehicle upward direction is formed;

at the upper wall, a second attachment portion that projects in the vehicle downward direction is formed in a position corresponding to the first attachment portion and the strut is disposed between the first attachment portion and the second attachment portion.

6. The fuel tank according to claim 1, wherein:

the first plate portion is formed in an inverted T-shape whose vehicle width direction central portion projects in the vehicle upward direction as seen from a vehicle front and rear direction; and the second plate portion is formed in a L-shape that extends obliquely in the vehicle upward direction from a vehicle width direction inner end portion as seen from the vehicle front and rear direction.

7. The fuel tank according to claim 1, wherein the holding portion includes a recessed portion that is configured to hold the fuel transfer line by elastically deforming.

* * * * *